(12) United States Patent
Gupta et al.

(10) Patent No.: US 10,999,007 B2
(45) Date of Patent: May 4, 2021

(54) TECHNIQUES AND APPARATUSES FOR SPATIAL DIVERSITY IN A COORDINATED MULTIPOINT NETWORK

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US); Hua Wang, Basking Ridge, NJ (US); Karl Georg Hampel, Hoboken, NJ (US)

(73) Assignee: Qualcomm Incorporated, San Diego, CA (US)

( * ) Notice: Subject to any disclaimer, the term of this patent is extended or adjusted under 35 U.S.C. 154(b) by 87 days.

(21) Appl. No.: 16/249,611

(22) Filed: Jan. 16, 2019

(65) Prior Publication Data
US 2019/0229848 A1    Jul. 25, 2019

Related U.S. Application Data

(60) Provisional application No. 62/620,836, filed on Jan. 23, 2018.

(51) Int. Cl.
*H04B 7/024*    (2017.01)
*H04L 1/00*    (2006.01)
(Continued)

(52) U.S. Cl.
CPC ........... *H04L 1/0048* (2013.01); *H04B 7/024* (2013.01); *H04L 1/1819* (2013.01); *H04W 28/04* (2013.01); *H04W 88/085* (2013.01)

(58) Field of Classification Search
CPC ........... H04W 72/042; H04W 72/1289; H04W 72/0446; H04W 74/0833; H04W 72/0413; H04W 72/12; H04W 28/04; H04W 88/085; H04L 5/0055; H04L 5/0007; H04L 1/1812; H04L 1/1896; H04L 1/1819; H04L 5/00; H04L 5/0044; H04L 5/0046;
(Continued)

(56) References Cited

U.S. PATENT DOCUMENTS 8,386,876 B2 *    2/2013  Khoshnevis .......... H04L 1/1819
                                                    714/750
9,143,957 B2 *    9/2015  Sadek .................... H04W 16/14
(Continued)

OTHER PUBLICATIONS

Interdigital communication "Comp joint transmission using redundancy versions"; 3GPP TSG RAN WG1 meeting #65; R1-111347; whole document; May 3, 2011 (Year: 2011).*
(Continued)

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of communications from a corresponding plurality of transmission/reception points (TRPs) included in a coordinated multipoint network. At least two communications, of the plurality of communications, may have different redundancy versions from a common codebook, and may be received in a same transmission time interval (TTI). The UE may decode the plurality of communications using joint decoding. Numerous other aspects are provided.

30 Claims, 11 Drawing Sheets

(51) Int. Cl.
*H04W 28/04* (2009.01)
*H04L 1/18* (2006.01)
*H04W 88/08* (2009.01)

(58) Field of Classification Search
CPC ....... H04L 1/1671; H04L 1/18; H04L 1/0048; H04B 7/024; H04B 7/0413; H04B 7/04; H04B 7/0452; Y02D 70/12; Y02D 70/126; Y02D 70/1262
See application file for complete search history.

(56) References Cited

U.S. PATENT DOCUMENTS

| | | | | |
|---|---|---|---|---|
| 2015/0327154 | A1* | 11/2015 | Xia | H04W 48/12 |
| | | | | 370/312 |
| 2016/0345331 | A1* | 11/2016 | Seyama | H04W 52/243 |
| 2018/0167124 | A1* | 6/2018 | Chen | H04B 7/0639 |
| 2018/0295651 | A1* | 10/2018 | Cao | H04W 76/27 |
| 2020/0154376 | A1* | 5/2020 | Ko | H04W 72/005 |

OTHER PUBLICATIONS

Interdigital Communications, et al., "COMP Joint Transmission using Multiple Redundancy Versions", 3GPP TSG RAN WG1 Meeting #65, 3GPP Draft; R1-111347, 3rd Generation Partnership Project (3GPP), Mobile Competence Centre, 650, Route Des Lucioles, F-06921 Sophia-Antipolis Cedex, France, vol. RAN WG1, No. Barcelona, Spain; May 9, 2011, May 3, 2011 (May 3, 2011), 8 Pages, XP050491068, [retrieved on May 3, 2011] the whole document.
International Search Report and Written Opinion—PCT/US2019/013964—ISA/EPO—dated May 2, 2019.

* cited by examiner

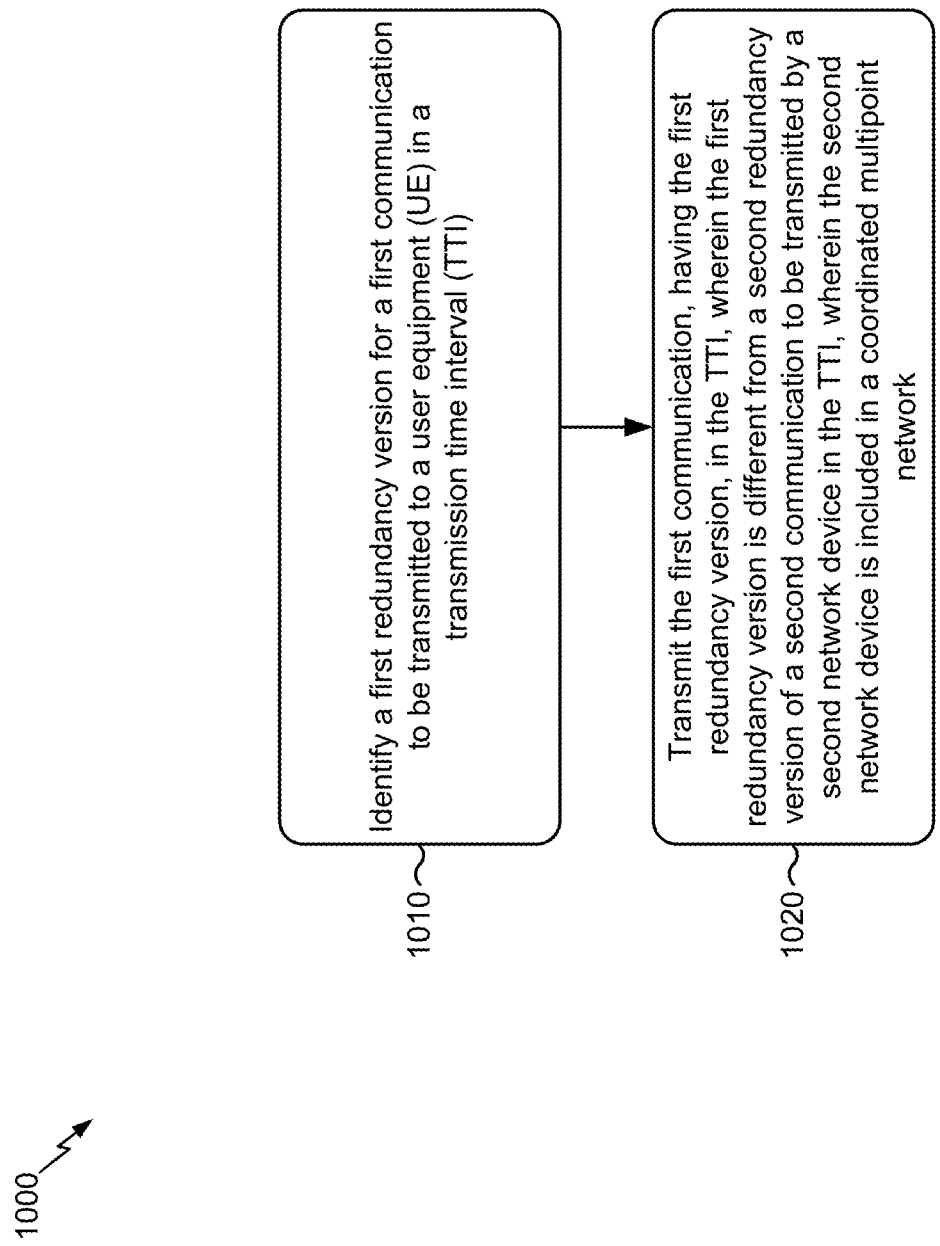

TECHNIQUES AND APPARATUSES FOR SPATIAL DIVERSITY IN A COORDINATED MULTIPOINT NETWORK

CROSS-REFERENCE TO RELATED APPLICATIONS UNDER 35 U.S.C. § 119

This application claims priority to U.S. Provisional Patent Application No. 62/620,836, filed on Jan. 23, 2018, entitled "TECHNIQUES AND APPARATUSES FOR SPATIAL DIVERSITY IN A COORDINATED MULTIPOINT NETWORK," which is hereby expressly incorporated by reference herein.

FIELD OF THE DISCLOSURE

Aspects of the present disclosure generally relate to wireless communication, and more particularly to techniques and apparatuses for spatial diversity in a coordinated multipoint network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a plurality of communications from a corresponding plurality of transmission/reception points (TRPs) included in a coordinated multipoint network, wherein at least two communications, of the plurality of communications, have different redundancy versions from a common codebook and are received in a same transmission time interval (TTI); and decoding the plurality of communications using joint decoding.

In some aspects, a method of wireless communication, performed by a first transmission/reception point (TRP) included in a coordinated multipoint network, may include identifying a first redundancy version for a first communication to be transmitted to a user equipment (UE) in a transmission time interval (TTI); and transmitting the first communication, having the first redundancy version, in the TTI, wherein the first redundancy version is different from a second redundancy version of a second communication to be transmitted by a second TRP in the TTI, wherein the second TRP is included in the coordinated multipoint network.

In some aspects, a user equipment (UE) for wireless communication may include memory and one or more processors operatively coupled to the memory. The memory and the one or more processors may be configured to receive a plurality of communications from a corresponding plurality of transmission/reception points (TRPs) included in a coordinated multipoint network, wherein at least two communications, of the plurality of communications, have different redundancy versions from a common codebook and are received in a same transmission time interval (TTI); and decode the plurality of communications using joint decoding.

In some aspects, a first transmission/reception point (TRP), included in a coordinated multipoint network, for wireless communication may include memory and one or more processors operatively coupled to the memory. The memory and the one or more processors may be configured to identify a first redundancy version for a first communication to be transmitted to a user equipment (UE) in a transmission time interval (TTI); and transmit the first communication, having the first redundancy version, in the TTI, wherein the first redundancy version is different from a second redundancy version of a second communication to be transmitted by a second TRP in the TTI, wherein the second TRP is included in the coordinated multipoint network.

In some aspects, a non-transitory computer-readable medium may store one or more instructions for wireless communication. The one or more instructions, when executed by one or more processors of a user equipment (UE), may cause the one or more processors to receive a plurality of communications from a corresponding plurality of transmission/reception points (TRPs) included in a coordinated multipoint network, wherein at least two communications, of the plurality of communications, have different redundancy versions from a common codebook and are received in a same transmission time interval (TTI); and decode the plurality of communications using joint decoding.

In some aspects, a non-transitory computer-readable medium may store one or more instructions for wireless communication. The one or more instructions, when executed by one or more processors of a first transmission/reception point (TRP) included in a coordinated multipoint network, may cause the one or more processors to identify a first redundancy version for a first communication to be transmitted to a user equipment (UE) in a transmission time interval (TTI); and transmit the first communication, having the first redundancy version, in the TTI, wherein the first redundancy version is different from a second redundancy version of a second communication to be transmitted by a second TRP in the TTI, wherein the second TRP is included in the coordinated multipoint network.

In some aspects, an apparatus for wireless communication may include means for receiving a plurality of communications from a corresponding plurality of transmission/reception points (TRPs) included in a coordinated multipoint network, wherein at least two communications, of the plurality of communications, have different redundancy versions from a common codebook and are received in a same transmission time interval (TTI); and means for decoding the plurality of communications using joint decoding.

In some aspects, a first apparatus, included in a coordinated multipoint network, for wireless communication may include means for identifying a first redundancy version for a first communication to be transmitted to a user equipment (UE) in a transmission time interval (TTI); and means for transmitting the first communication, having the first redundancy version, in the TTI, wherein the first redundancy version is different from a second redundancy version of a second communication to be transmitted by a second apparatus in the TTI, wherein the second apparatus is included in the coordinated multipoint network.

Aspects generally include a method, apparatus, system, computer program product, non-transitory computer-readable medium, user equipment, base station, wireless communication device, transmission/reception point, controller, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes for spatial diversity in a coordinated multipoint network, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
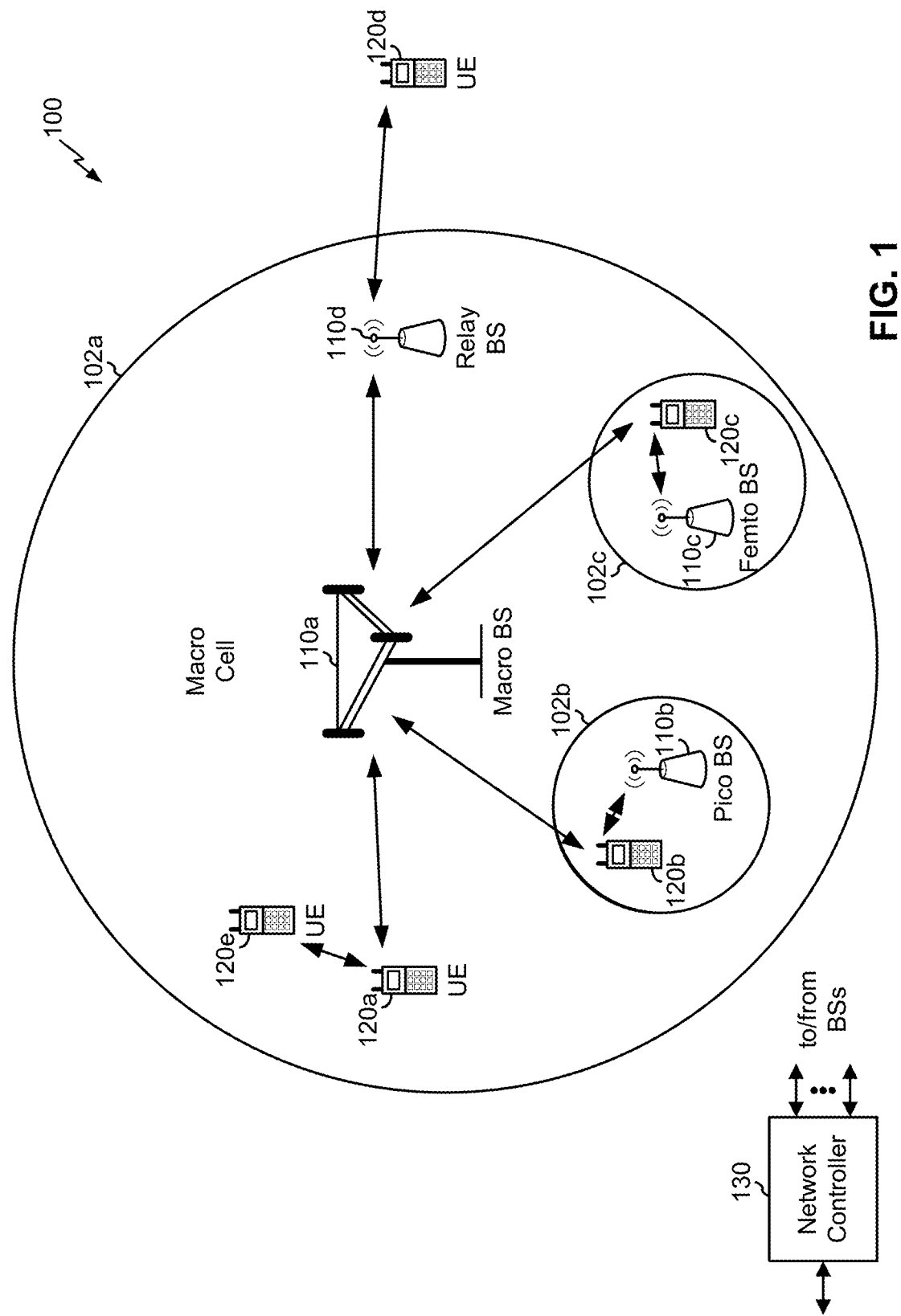
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, actuators, programmable logic controllers (PLCs), meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
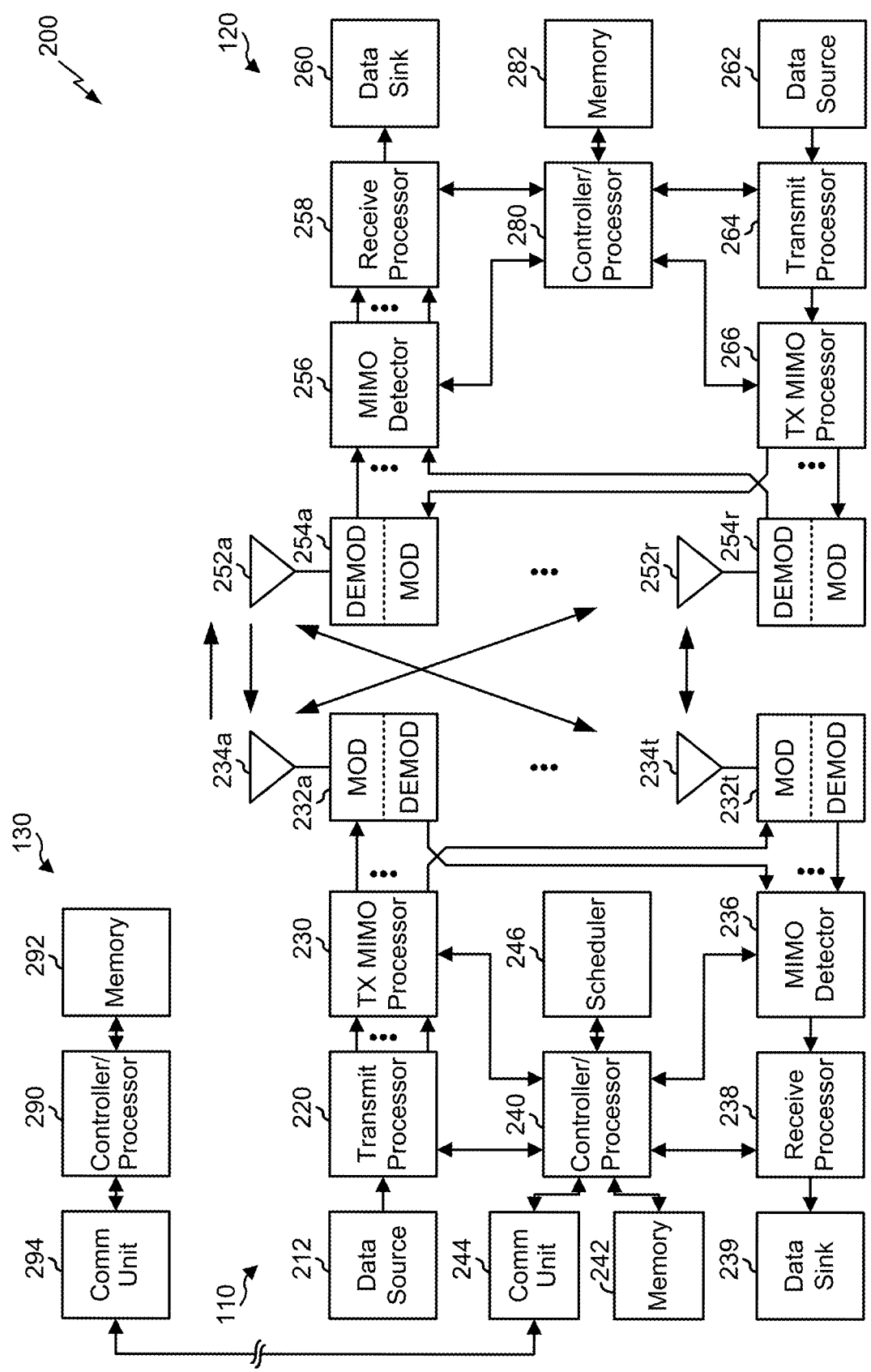
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with spatial diversity in a coordinated multipoint network, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a plurality of communications from a corresponding plurality of transmission/reception points (TRPs) included in a coordinated multipoint network, wherein at least two communications, of the plurality of communications, have different redundancy versions from a common codebook and are received in a same transmission time interval (TTI); means for decoding the plurality of communications using joint decoding; and/or the like. In some aspects, such means may include one or more components of UE 120 described in connection with FIG. 2.

In some aspects, base station 110 and/or a TRP associated with base station 110 may include means for identifying a first redundancy version for a first communication to be transmitted to a user equipment (UE) in a transmission time interval (TTI); means for transmitting the first communication, having the first redundancy version, in the TTI, wherein the first redundancy version is different from a second redundancy version of a second communication to be transmitted by a second TRP in the TTI, wherein the second TRP is included in the coordinated multipoint network; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
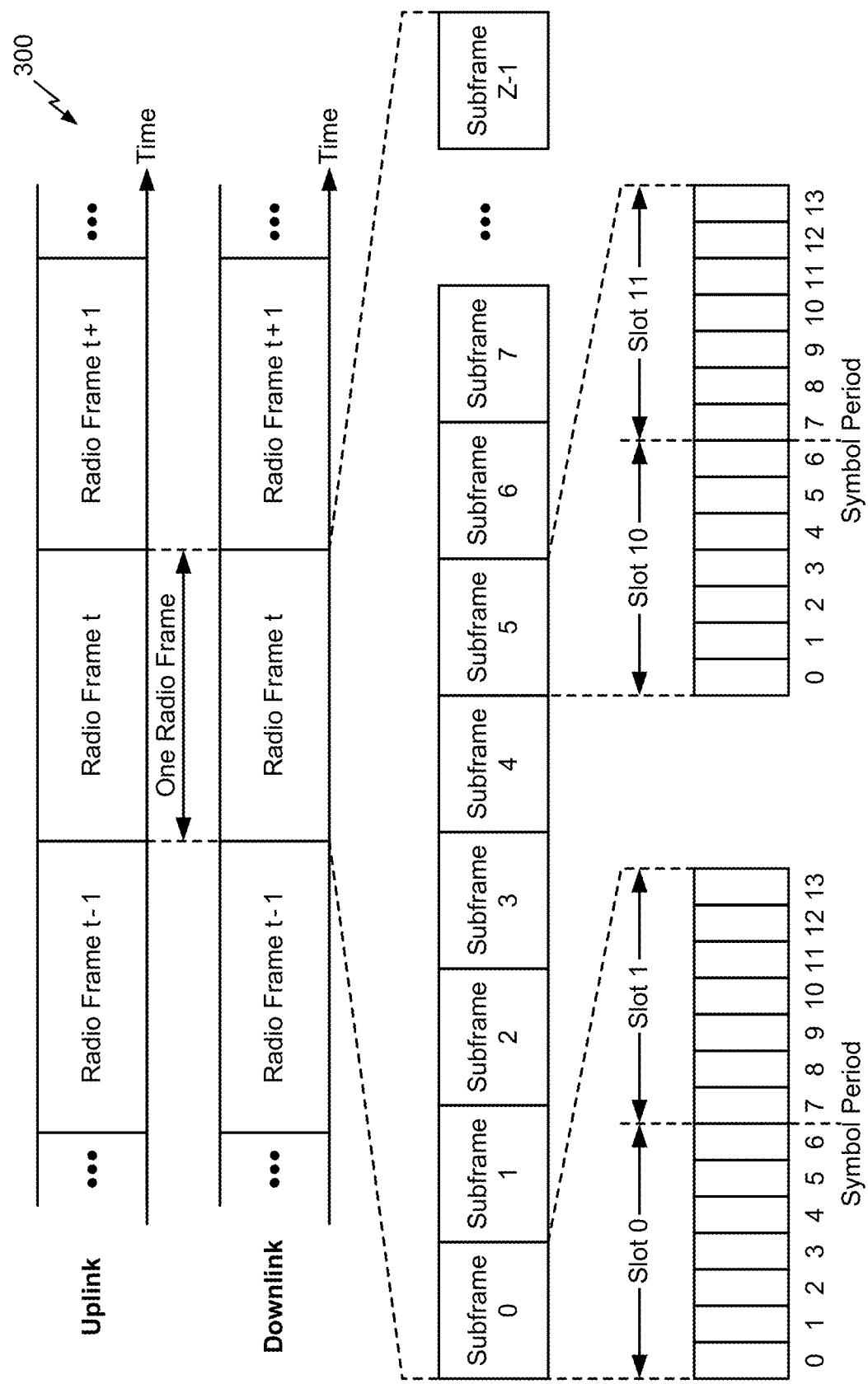
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods (e.g., where L depends on a configuration, whether the slot is a mini-slot, and/or the like). For example, each slot may include seven symbol periods (e.g., as shown in FIG. 3A, such as for a type of mini-slot), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based (e.g., a number of symbols included in a mini-slot used for scheduling), and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
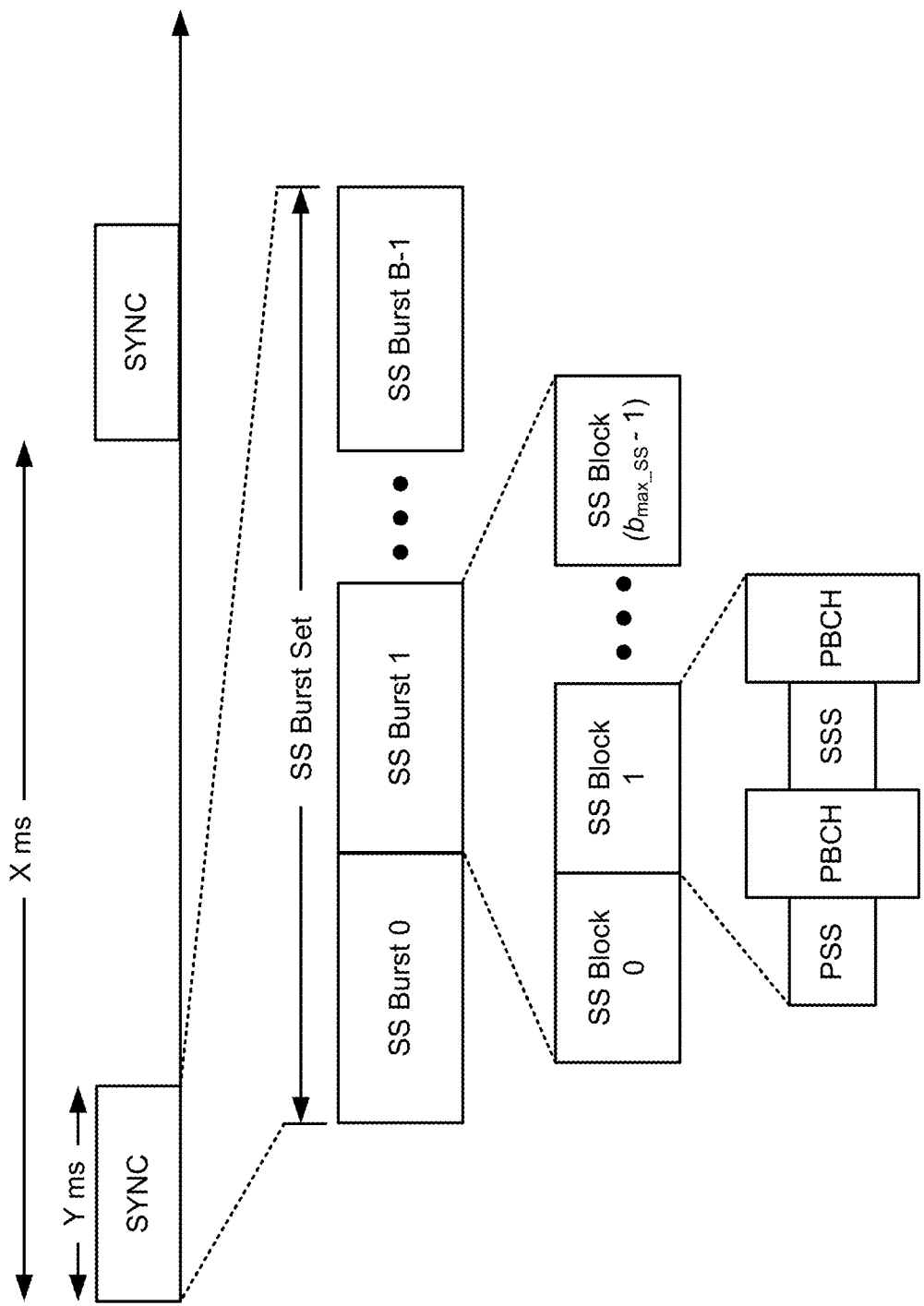
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
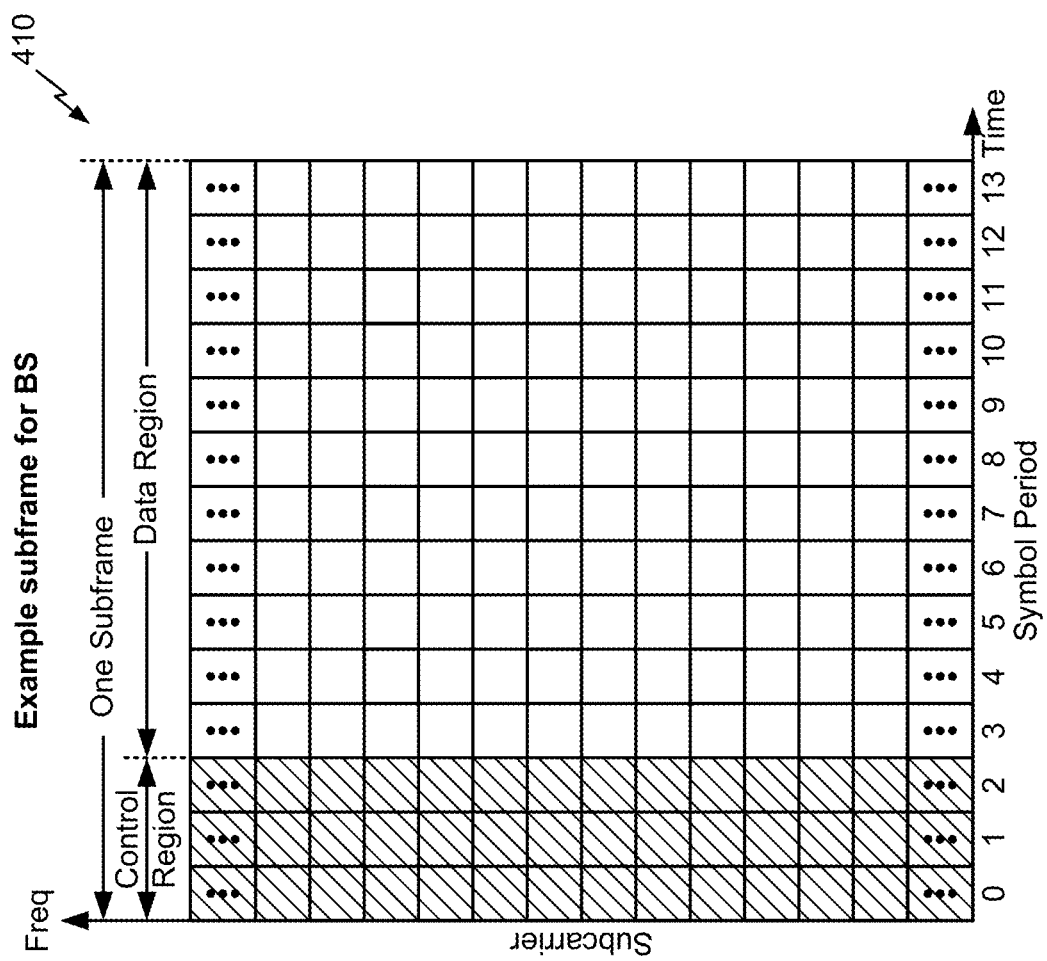
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
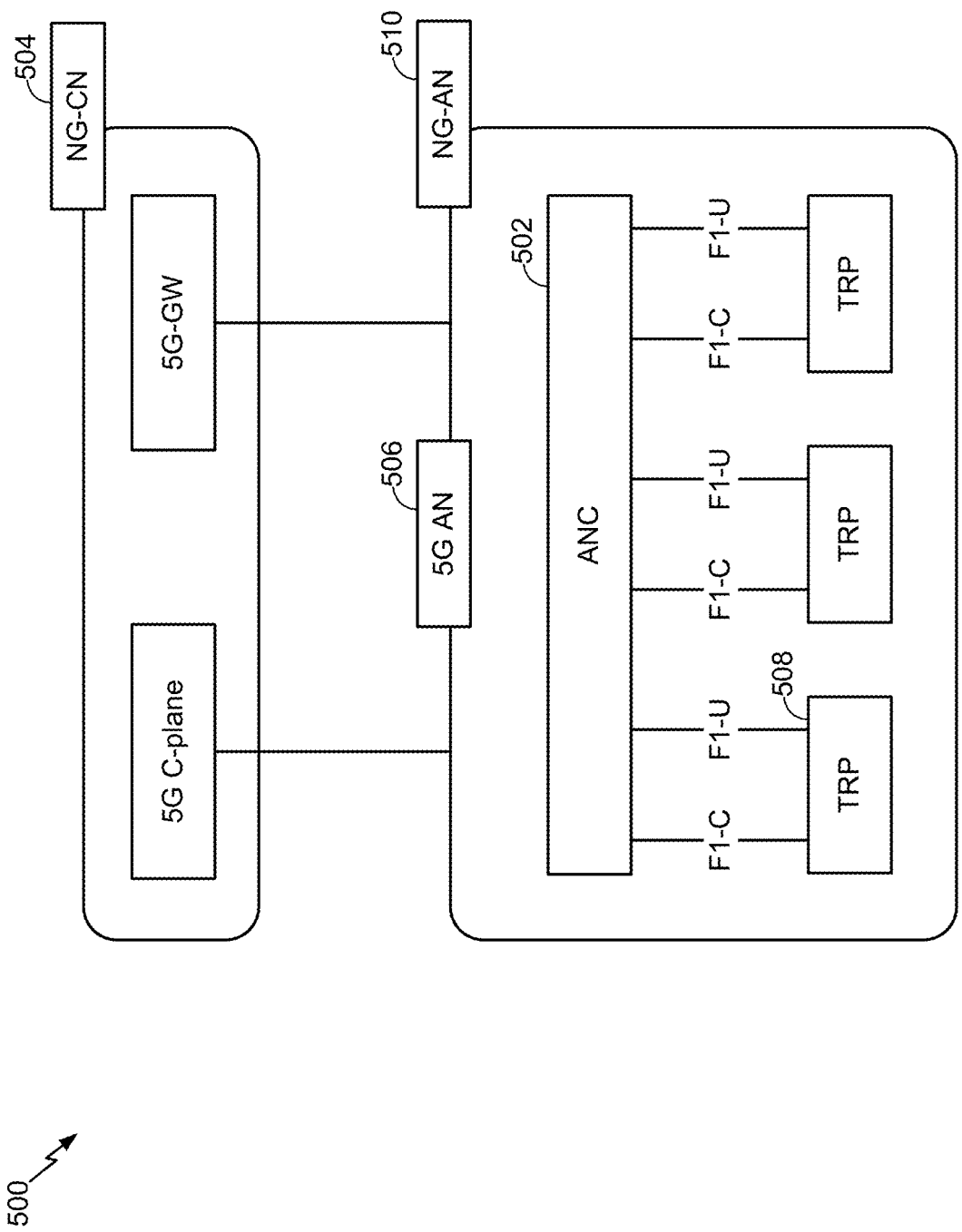
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/ present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
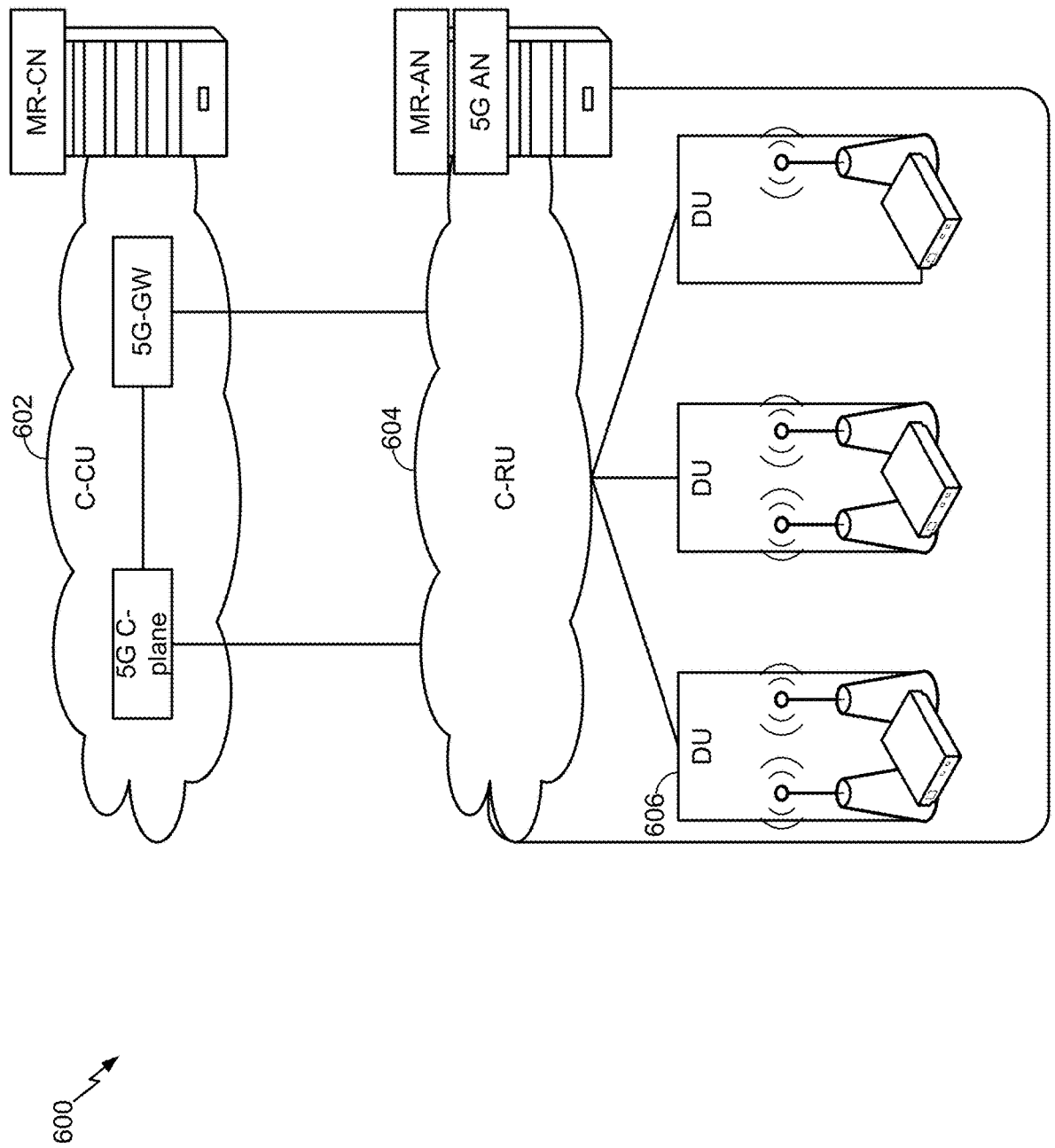
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
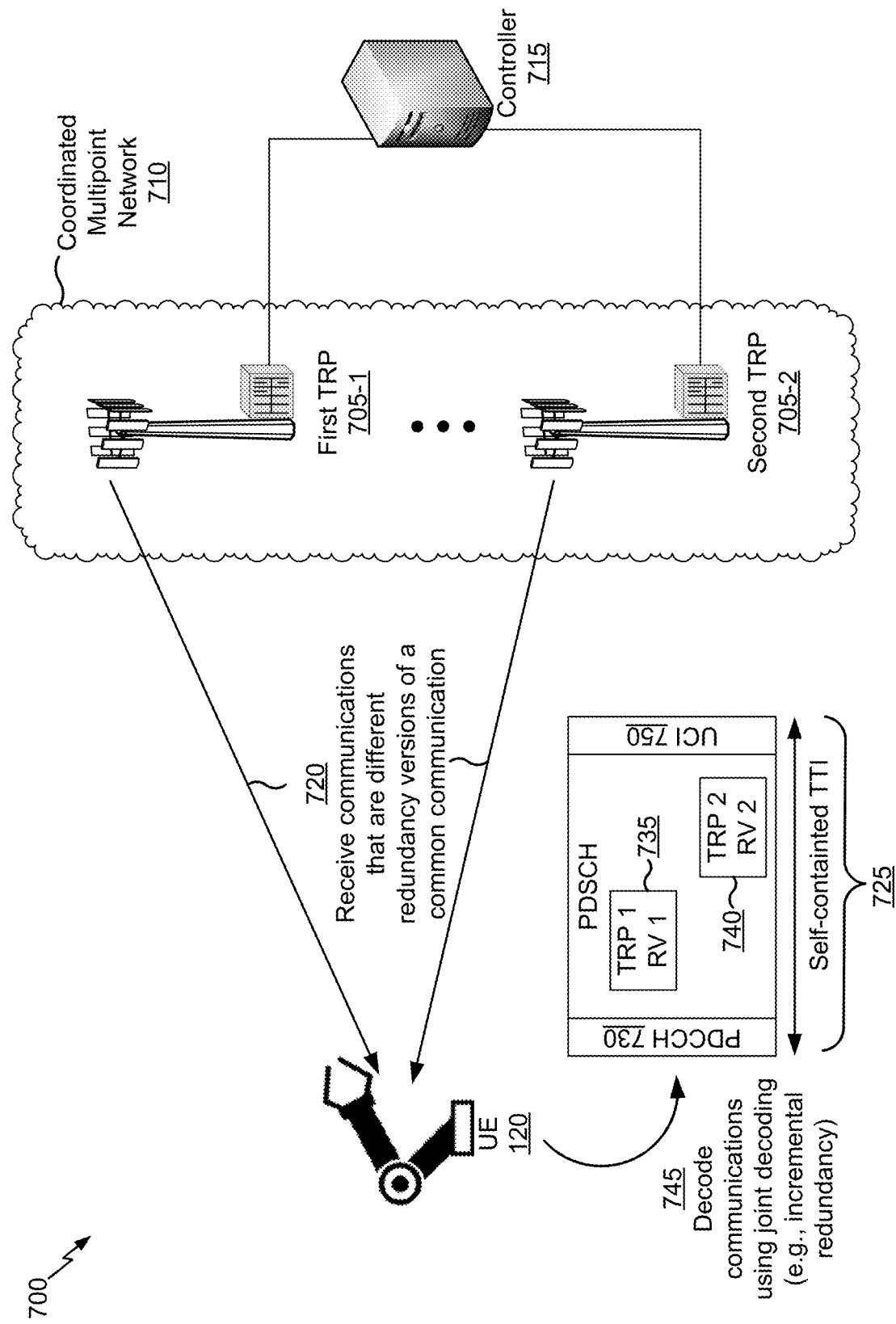
FIGS. 7 and 8 are diagrams illustrating examples of spatial diversity in a coordinated multipoint network, in accordance with various aspects of the present disclosure.

FIG. 7 is a diagram illustrating an example 700 of spatial diversity in a coordinated multipoint network, in accordance with various aspects of the present disclosure.

As shown in FIG. 7, a UE 120 (e.g., an MTC UE and/or the like, shown as a robotic arm) may be capable of communicating with multiple TRPs 705 (e.g., a base station 110, an antenna 234 of base station 110, a TRP 508, a DU 606, and/or the like), shown as a first TRP 705-1 and a second TRP 705-2. The multiple TRPs 705 may be included in a coordinated multipoint network 710, and transmissions of the TRPs 705 may be coordinated (e.g., controlled, scheduled, generated) using a controller 715 (e.g., a network controller 130, a controller/processor 240 of base station 110, an ANC 502, a C-RU 604, and/or the like) that exchanges information with the TRPs 705. The coordinated multipoint network 710 may be used to send information to the UE 120 and/or receive information from the UE 120 via multiple TRPs 705 to improve performance (e.g., in case of dynamic network conditions, poor network conditions, and/or the like).

In some aspects, the controller 715 may be a base station (e.g., that includes a controller/processor 240, a memory 242, a scheduler 246, and/or the like of base station 110), and the TRPs 705 may be remote radio heads of the base station (e.g., which may include transmit/receive components of base station 110, such as transmit processor 220, TX MIMO processor 230, MOD/DEMOD 232, antenna 234, MIMO detector 236, receive processor 238, and/or the like). In some aspects, the controller 715 may be a network controller (e.g., network controller 130), and the TRPs 705 may be base stations 110 in communication with the network controller.

In some aspects, at least two TRPs 705 in the coordinated multipoint network 710 (e.g., the first TRP 705-1 and the second TRP 705-2) may use different frequency bands for communication. For example, the coordinated multipoint network 710 may be a frequency reuse network (e.g., may employ frequency reuse across TRPs 705), where different TRPs 705 reuse frequency bands, but adjacent TRPs 705 use different frequency bands to mitigate interference. In this case, the first TRP 705-1 and the second TRP 705-2 may be adjacent TRPs 705 or may otherwise use different frequency bands for communication (e.g., according to a frequency reuse pattern employed by the coordinated multipoint network 710). Although the coordinated multipoint network 710 of FIG. 7 shows two TRPs 705, in practice, the coordinated multipoint network 710 may include more than two TRPs 705.

The TRPs 705 in the coordinated multipoint network 710 may use coordinated scheduling and/or coordinated beamforming to improve performance. In coordinated scheduling, the TRPs 705 may communicate with the controller 715, which may perform centralized scheduling for transmissions to a UE 120 (or multiple UEs 120) by multiple TRPs 705. The transmissions may be scheduled to occur at the same time (e.g., using the same frequency or different frequencies), or may be scheduled to occur at different times (e.g., using the same frequency or different frequencies), so as to improve reception by the UE 120. In some aspects, multiple TRPs 705 may share channel state information for communicating with UEs 120, but a data packet to be transmitted to a UE 120 may be available only at a single TRP 705. In some aspects, the TRPs 705 and the controller 715 may communicate using a local time sensitive network to reduce the latency of information exchanged between a TRP 705 and the controller 715. The local time sensitive network may be a wired network, a wireless network, or a network that includes both wired communication and wireless communication.

In some aspects, the controller 715 may instruct the TRPs 705 to transmit using joint transmission (JT), where multiple TRPs 705 transmit the same information to a UE 120 in the same time slot using coordinated beamforming (e.g., with appropriate beamforming weights applied to transmissions by different TRPs 705). In some aspects, the controller 715 may instruct the TRPs 705 to transmit using dynamic point selection (DPS), where a single TRP 705 transmits information to a UE 120 per time slot (e.g., using appropriate beamforming, which may be indicated to the TRP 705 by the controller 715), and where different TRPs 705 may be scheduled for transmission to the UE 120 in different time slots. This may improve performance by dynamically scheduling different TRPs 705 to transmit information to the UE 120 based at least in part on channel conditions, which may account for shadowing, channel fading, and/or the like.

However, in some settings, such as an industrial environment (e.g., a factory that uses factory automation for communication between machines), a channel condition referred to as fast shadowing may occur. In fast shadowing, channel conditions may change very quickly due to reflection and/or blockage of signals by machines that move rapidly (e.g., a mechanical arm, a robot, and/or the like), such as up to 20 meters per second, for example. Often, channel conditions in fast shadowing may change so rapidly (e.g., every 10*ms* and/or the like) that re-association and/or handover to a different TRP 705, which may take approximately 65-90 ms, may not be fast enough to keep up with the change in channel conditions (e.g., channel conditions may change dramatically before handover is completed). In this case, transmissions by multiple TRPs 705 in a coordinated multipoint network 710 may be used to increase spatial diversity and improve reception of signals.

In some aspects, a hybrid automatic repeat request (HARQ) procedure may be used in a coordinated multipoint network 710 and/or in a setting where fast shadowing may occur. In this case, channel conditions may change rapidly, such that the TRP 705 that transmits a failed communication to a UE 120 (e.g., a communication for which the UE 120 responds with a negative acknowledgement, or NACK) may have poor channel conditions with the UE 120 after the NACK is received and a retransmission is to occur. In this case, one or more retransmissions may be transmitted by a different TRP 705 and/or by multiple TRPs 705 (e.g., including or excluding the original TRP 705 that transmitted the failed communication).

Some techniques and apparatuses described herein permit the use of spatial diversity in a coordinated multipoint network, thereby improving network performance and permitting the TRPs 705 to communicate with the UE 120 in a low latency, high reliability network, such as a URLLC network (e.g., to satisfy a latency requirement, a reliability requirement, a URLLC requirement, and/or the like). For example, some techniques and apparatuses described herein may permit satisfaction of one or more network requirements associated with a factory automation setting, such as a latency requirement (e.g., of 1 ms, 5 ms, 10 ms, and/or the like), a reliability requirement (e.g., of $10^{-5}$, $10^{-7}$, $10^{-9}$, and/or the like), and/or the like. Furthermore, some techniques and apparatuses described herein use joint decoding (e.g., with incremental redundancy) to improve decoding performance for communications received from multiple TRPs 705 using spatial diversity.

As shown by reference number 720, the UE 120 may receive multiple communications from corresponding multiple TRPs 705 included in the coordinated multipoint network 710, and different communications of the multiple communications may have different redundancy versions. For example, the UE 120 may receive a first communication from the first TRP 705-1, and may receive a second communication from the second TRP 705-1. The first communication and the second communication may be different redundancy versions of a common communication (e.g., the same communication). The different redundancy versions may be derived from a common codebook, where the same codeword is punctured differently to generate different redundancy versions that include different combinations of information bits and parity bits.

In some aspects, the common communication may be an initial communication (e.g., other than a HARQ retransmission). In this case, the first communication and the second communication may be different redundancy versions of the initial communication. In some aspects, the common communication may be a retransmission (e.g., a HARQ retransmission), as described in more detail below in connection with FIG. 8. In this case, the first communication and the second communication may be different redundancy versions of the retransmission.

In example 700, the UE 120 is shown as receiving a first communication, having a first redundancy version, from the first TRP 705-1 and receiving a second communication, having a second redundancy version, from the second TRP 705-2. In this case, the first TRP 705-1 may identify the first redundancy version (e.g., based at least in part on information received from the controller 715 and/or hard-coded in memory of the first TRP 705-1), and may transmit the first communication, having the first redundancy version, to the UE 120. Similarly, the second TRP 705-2 may identify the second redundancy version, and may transmit the second communication, having the second redundancy version, to the UE 120. In practice, the UE 120 may receive a different number of communications (e.g., three communications, four communications, and/or the like) from a different number of TRPs 705 (e.g., three TRPs 705, four TRPs 705, and/or the like). In some aspects, all of the received communications may have different redundancy versions. In some aspects, fewer than all of the received communications may have different redundancy versions.

As shown by reference number 725, the multiple communications may be transmitted and/or received in a same transmission time interval (TTI), such as a subframe, a slot, a mini-slot, a number of symbols, and/or the like. In some aspects, the TTI is a self-contained TTI, where downlink control information (DCI) (e.g., a downlink grant and/or the like), downlink data corresponding to the DCI, and uplink control information (UCI) (e.g., acknowledgement (ACK) or negative acknowledgment (NACK) feedback and/or the like) corresponding to the downlink data are all communicated within the TTI.

For example, one or more TRPs 705 may transmit, and the UE 120 may receive, DCI in a downlink control channel portion 730 (e.g., shown as PDCCH) of the TTI. The DCI may include control information regarding a first communication 735, from the first TRP 705-1 (e.g., shown as TRP 1), and a second communication 740 from the second TRP 705-2 (e.g., shown as TRP 2). For example, the DCI may indicate a first set of resource blocks (e.g., time and/or frequency resources) to be monitored by the UE 120 to receive the first communication 735, and may indicate a second set of resource blocks to be monitored by the UE 120 to receive the second communication 740. As shown, the first communication may have a first redundancy version (e.g., shown as RV 1), and the second communication may have a second redundancy version (e.g., shown as RV 2). In some aspects, the redundancy versions of the communications 735, 740 may be indicated in the DCI.

As shown by reference number 745, the UE 120 may decode the multiple communications using joint decoding. For example, because the multiple communications have different redundancy versions, the UE 120 may use incremental redundancy (e.g., instead of chase combining) to decode the communications, thereby increasing a decoding speed, increasing a decoding accuracy, reducing network resources needed for retransmissions, and/or the like. In this way, spatial diversity may be used within the coordinated multipoint network 710 to improve decoding performance and improve network performance (e.g., to satisfy a latency requirement, a reliability requirement, a URLLC requirement, and/or the like).

As shown by reference number 750, in some aspects, the UE 120 may transmit, and one or more TRPs 705 may receive, UCI in the TTI. In some aspects, the UCI may include ACK or NACK feedback for the first communication and/or the second communication. In some aspects, if the UE 120 is unable to decode the common communication using the first communication and the second communication, the UE 120 may transmit a NACK, and may receive multiple retransmissions, from multiple TRPs 705, that are different redundancy versions of the common communication, as described below in connection with FIG. 8.

As indicated above, FIG. 7 is provided as an example. Other examples are possible and may differ from what was described with respect to FIG. 7.

Figure 8:
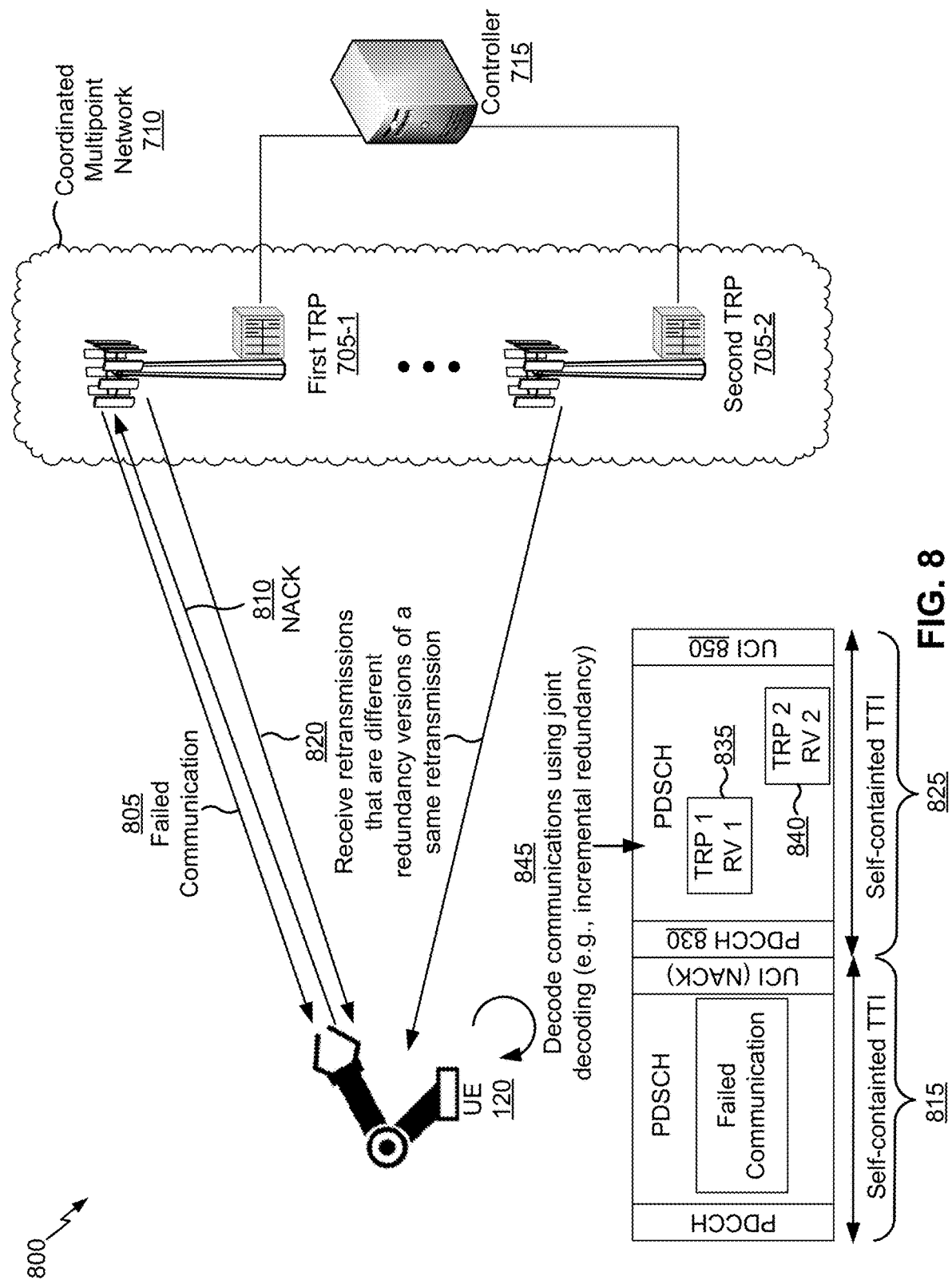

FIG. 8 is a diagram illustrating another example 800 of spatial diversity in a coordinated multipoint network, in accordance with various aspects of the present disclosure.

As shown by reference number 805, a communication from a TRP 705 to the UE 120 may fail, and the UE 120 may determine that the communication has failed (e.g., was not successfully received). For example, the UE 120 may receive the communication (e.g., a packet and/or the like), and may be unable to decode the communication, may detect an error after decoding the communication (e.g., after performing a cyclic redundancy check), and/or the like. In some aspects, the communication may be an initial communication (e.g., not a retransmission). In some aspects, the communication may be a retransmission.

As shown by reference number 810, the UE 120 may transmit a negative acknowledgement (NACK) corresponding to the failed communication based at least in part on determining that the communication was not successfully received. As shown, in some aspects, the UE 120 may transmit the NACK to the same TRP 705 that transmitted the failed communication. However, in some aspects, the UE 120 may transmit the NACK to a TRP 705 other than the TRP 705 that transmitted the failed communication (e.g., the UE 120 may transmit the NACK to a plurality of TRPs 705 that include the TRP 705 that transmitted the failed communication, the UE 120 may transmit the NACK to one or more TRPs 705 that do not include the TRP 705 that transmitted the failed communication, and/or the like).

As shown by reference number 815, the failed communication and/or the NACK may be transmitted and/or received in the same TTI (e.g., a self-contained TTI), such as a subframe, a slot, a mini-slot, a number of symbols, and/or the like. For example, the failed communication may be transmitted and/or received in a data portion (e.g., shown as PDSCH) of the TTI, and the NACK may be transmitted in an uplink control portion (e.g., shown as UCI) of the TTI.

As shown by reference number 820, based at least in part on receiving the NACK, multiple TRPs 705 in the coordinated multipoint network 710 may transmit retransmissions that are different redundancy versions of a common retransmission (e.g., the same retransmission), in a similar manner as described above in connection with FIG. 7. For example, one or more TRPs 705 may receive the NACK, and may report the NACK to the controller 715, which may coordinate the retransmissions by multiple TRPs 705. As shown, the UE 120 may receive the multiple retransmissions from corresponding multiple TRPs 705 based at least in part on transmitting the NACK corresponding to the failed communication. For example, the UE 120 may receive a first retransmission from the first TRP 705-1, and may receive a second retransmission from the second TRP 705-1. The first retransmission and the second retransmission may be different redundancy versions of a common communication (e.g., the same retransmission), as described above in connection with FIG. 7. In some aspects, the TRP 705 that transmitted the failed communication (e.g., the first TRP 705-1) may transmit a retransmission to the UE 120, and the UE 120 may receive such a communication, as shown. However, in some aspects, the TRP 705 that transmitted the failed communication may not transmit a retransmission to the UE 120, and multiple TRPs 705 other than that TRP 705 may transmit the retransmissions to the UE 120.

As shown by reference number 825, the multiple retransmissions may be transmitted and/or received in a same transmission time interval (TTI) (e.g., a self-contained TTI), such as a subframe, a slot, a mini-slot, a number of symbols, and/or the like. For example, one or more TRPs 705 may transmit, and the UE 120 may receive, DCI in a downlink control channel portion 830 (e.g., shown as PDCCH) of the TTI. The DCI may include control information regarding a first retransmission 835, from the first TRP 705-1 (e.g., shown as TRP 1), and a second retransmission 840 from the second TRP 705-2 (e.g., shown as TRP 2), as described above in connection with FIG. 7. As shown, the first retransmission may have a first redundancy version (e.g., shown as RV 1), and the second retransmission may have a second redundancy version (e.g., shown as RV 2). In some aspects, the TTI that includes the retransmission may immediately follow the TTI that includes the failed communication, so as to reduce latency.

As shown by reference number 845, the UE 120 may decode the multiple retransmissions using joint decoding (e.g., incremental redundancy), in a similar manner as described above in connection with FIG. 7, thereby increasing a decoding speed, increasing a decoding accuracy, reducing network resources needed for retransmissions, and/or the like. In this way, spatial diversity may be used within the coordinated multipoint network 710 to improve decoding performance and improve network performance (e.g., to satisfy a latency requirement, a reliability requirement, a URLLC requirement, and/or the like).

As shown by reference number 850, in some aspects, the UE 120 may transmit, and one or more TRPs 705 may receive, UCI in the TTI that includes the retransmissions. In some aspects, the UCI may include ACK or NACK feedback for the first retransmission and/or the second retransmission. In some aspects, if the UE 120 is unable to decode the common retransmission using the first retransmission and the second retransmission, the UE 120 may transmit one or more NACKs, and may receive multiple retransmissions, from multiple TRPs 705, that are different redundancy versions of the common retransmission, in a similar manner as described above.

As indicated above, FIG. 8 is provided as an example. Other examples are possible and may differ from what was described with respect to FIG. 8.

Figure 9:
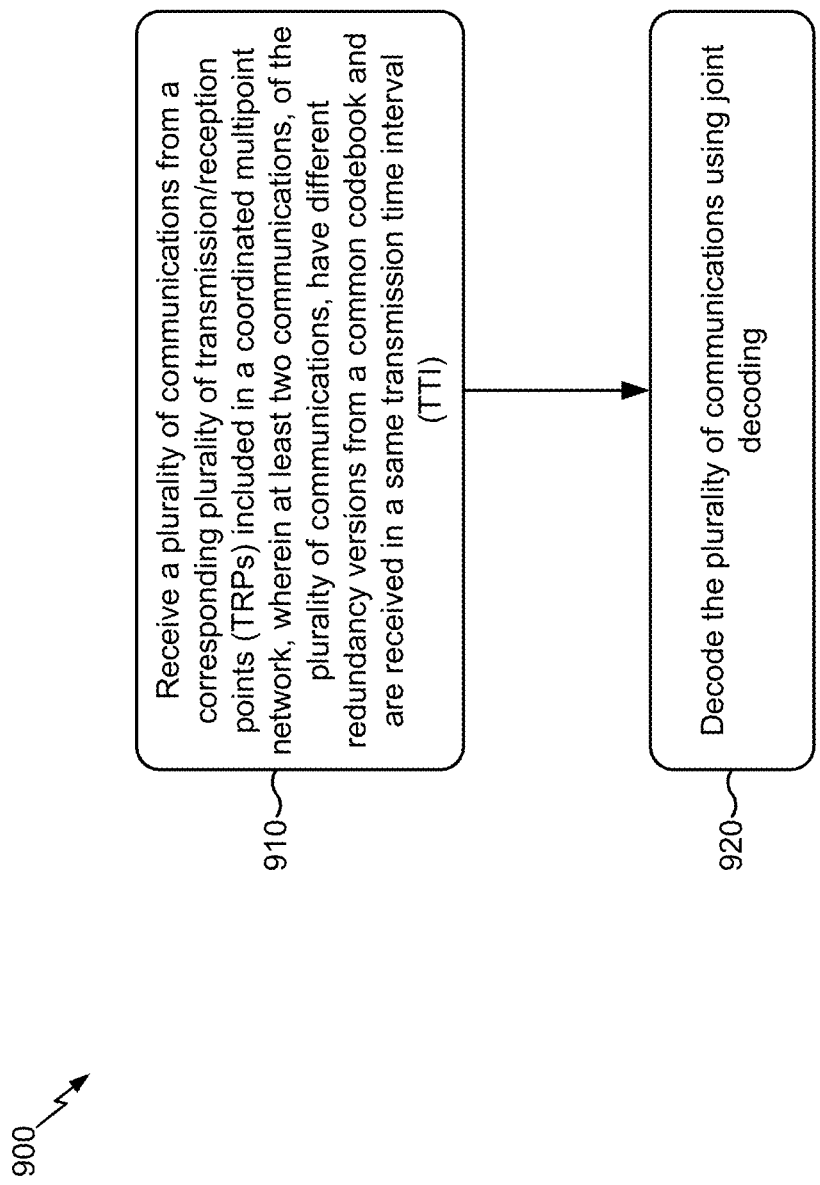

FIG. 9 is a diagram illustrating an example process 900 performed, for example, by a UE, in accordance with various aspects of the present disclosure. Example process 900 is an example where a UE (e.g., UE 120 and/or the like) performs operations to assist with achieving spatial diversity in a coordinated multipoint network.

As shown in FIG. 9, in some aspects, process 900 may include receiving a plurality of communications from a corresponding plurality of transmission/reception points (TRPs) included in a coordinated multipoint network, wherein at least two communications, of the plurality of communications, have different redundancy versions from a common codebook and are received in a same transmission time interval (TTI) (block 910). For example, the UE may receive (e.g., using antenna 252, DEMOD 254, MIMO detector 256, receive processor 258, controller/processor 280, and/or the like) a plurality of communications from a corresponding plurality of TRPs included in a coordinated multipoint network, as described above in connection with FIGS. 7 and 8. In some aspects, at least two communications, of the plurality of communications, have different redundancy versions from a common codebook. In some aspects, the at least two communications are received in a same TTI.

As further shown in FIG. 9, in some aspects, process 900 may include decoding the plurality of communications using joint decoding (block 920). For example, the UE may decode (e.g., using MIMO detector 256, receive processor 258, controller/processor 280 and/or the like) the plurality of communications using joint decoding, as described above in connection with FIGS. 7 and 8.

Process 900 may include additional aspects, such as any single aspect or any combination of aspects described below.

In some aspects, the plurality of communications are different redundancy versions of an initial transmission. In some aspects, the plurality of communications are different redundancy versions of a retransmission.

In some aspects, the plurality of communications are received based at least in part on transmitting a negative acknowledgement (NACK) corresponding to a failed communication from a TRP included in the coordinated multipoint network. In some aspects, a communication, of the plurality of communications, is received from the TRP. In some aspects, the plurality of communications are received from TRPs other than the TRP.

In some aspects, the plurality of TRPs include a plurality of remote radio heads of a same base station. In some aspects, the plurality of TRPs include a plurality of base stations in communication with a controller. In some aspects, the TTI is a slot, a mini-slot, or a number of symbols. In some aspects, the plurality of TRPs communicate with the UE in a low latency, high reliability network.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a TRP, in accordance with various aspects of the present disclosure. Example process 1000 is an example where a TRP (e.g., base station 110, TRP 705, and/or the like) performs operations to assist with achieving spatial diversity in a coordinated multipoint network.

As shown in FIG. 10, in some aspects, process 1000 may include identifying a first redundancy version for a first communication to be transmitted to a user equipment (UE) in a transmission time interval (TTI) (block 1010). For example, a first TRP may identify (e.g., using controller/processor 240, input from communication unit 244, input from data source 212, and/or the like) a first redundancy version for a first communication to be transmitted to a UE in a TTI, as described above in connection with FIGS. 7 and 8.

As further shown in FIG. 10, in some aspects, process 1000 may include transmitting the first communication, having the first redundancy version, in the TTI, wherein the first redundancy version is different from a second redundancy version of a second communication to be transmitted by a second TRP in the TTI, wherein the second TRP is included in a coordinated multipoint network (block 1020). For example, the first TRP may transmit (e.g., using controller/processor 240, transmit processor 220, TX MIMO processor 230, MOD 232, antenna 234, and/or the like) the first communication, having the first redundancy version, in the TTI, as described above in connection with FIGS. 7 and 8. In some aspects, the first redundancy version is different from a second redundancy version of a second communication to be transmitted by a second TRP in the TTI. In some aspects, the second TRP is included in a coordinated multipoint network with the first TRP.

Process 1000 may include additional aspects, such as any single aspect or any combination of aspects described below.

In some aspects, the first communication and the second communication are different redundancy versions of an initial transmission. In some aspects, the first communication and the second communication are different redundancy versions of a retransmission.

In some aspects, the first communication and the second communication are transmitted based at least in part on receiving a negative acknowledgement (NACK) corresponding to a failed communication from a TRP included in the coordinated multipoint network. In some aspects, the TRP is the first TRP. In some aspects, the TRP is not the first TRP.

In some aspects, the first TRP and the second TRP are different remote radio heads of a same base station. In some aspects, the first TRP and the second TRP are different base stations in communication with a controller. In some aspects, the TTI is a slot, a mini-slot, or a number of symbols. In some aspects, the first TRP and the second TRP communicate with the UE in a low latency, high reliability network.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a plurality of communications from a corresponding plurality of transmission/reception points (TRPs) included in a coordinated multipoint network,
        wherein at least two communications, of the plurality of communications, have different redundancy versions from a common codebook and are received in a transmission time interval (TTI), and
        wherein downlink control information (DCI) associated with the at least two communications are received in the TTI;
    decoding the plurality of communications using joint decoding; and
    transmitting uplink control information (UCI) associated with the at least two communications in the TTI.

2. The method of claim 1, wherein the plurality of communications are different redundancy versions of an initial transmission.

3. The method of claim 1, wherein the plurality of communications are different redundancy versions of a retransmission.

4. The method of claim 1, wherein the plurality of communications are received based at least in part on transmitting a negative acknowledgement (NACK) corresponding to a failed communication from a TRP included in the coordinated multipoint network.

5. The method of claim 4, wherein a communication, of the plurality of communications, is received from the TRP.

6. The method of claim 4, wherein the plurality of communications are received from TRPs other than the TRP.

7. The method of claim 1, wherein the plurality of TRPs include a plurality of remote radio heads of a same base station.

8. The method of claim 1, wherein the plurality of TRPs include a plurality of base stations in communication with a controller.

9. The method of claim 1, wherein the TTI is a slot, a mini-slot, or a number of symbols.

10. The method of claim 1, wherein the plurality of TRPs communicate with the UE in a low latency, high reliability network.

11. A method of wireless communication performed by a first transmission/reception point (TRP) included in a coordinated multipoint network, comprising:
    identifying a first redundancy version for a first communication to be transmitted to a user equipment (UE) in a transmission time interval (TTI);
    transmitting the first communication, having the first redundancy version, in the TTI,
        wherein the first redundancy version is different from a second redundancy version of a second communication to be transmitted by a second TRP in the TTI,
        wherein the second TRP is included in the coordinated multipoint network, and
        wherein downlink control information (DCI) associated with the first communication and the second communication are transmitted in the TTI; and
    receiving uplink control information (UCI) associated with the first communication and the second communication in the TTI.

12. The method of claim 11, wherein the first communication and the second communication are different redundancy versions of an initial transmission.

13. The method of claim 11, wherein the first communication and the second communication are different redundancy versions of a retransmission.

14. The method of claim 11, wherein the first communication and the second communication are transmitted based at least in part on receiving a negative acknowledgement (NACK) corresponding to a failed communication from a TRP included in the coordinated multipoint network.

15. The method of claim 14, wherein the TRP is the first TRP.

16. The method of claim 14, wherein the TRP is not the first TRP.

17. The method of claim 11, wherein the first TRP and the second TRP are different remote radio heads of a same base station.

18. The method of claim 11, wherein the first TRP and the second TRP are different base stations in communication with a controller.

19. The method of claim 11, wherein the TTI is a slot, a mini-slot, or a number of symbols.

20. The method of claim 11, wherein the first TRP and the second TRP communicate with the UE in a low latency, high reliability network.

21. A user equipment (UE) for wireless communication, comprising:
    memory; and
    one or more processors coupled to the memory, the memory and the one or more processors configured to:
        receive a plurality of communications from a corresponding plurality of transmission/reception points (TRPs) included in a coordinated multipoint network,
            wherein at least two communications, of the plurality of communications, have different redundancy versions from a common codebook and are received in a transmission time interval (TTI), and
            wherein downlink control information (DCI) associated with the at least two communications are received in the TTI;
        decode the plurality of communications using joint decoding; and
        transmit uplink control information (UCI) associated with the at least two communications in the TTI.

22. The UE of claim 21, wherein the plurality of communications are different redundancy versions of an initial transmission or a retransmission.

23. The UE of claim 21, wherein the plurality of communications are received based at least in part on transmitting a negative acknowledgement (NACK) corresponding to a failed communication from a TRP included in the coordinated multipoint network.

24. The UE of claim 23, wherein a communication, of the plurality of communications, is received from the TRP.

25. The UE of claim 23, wherein the plurality of communications are received from TRPs other than the TRP.

26. A first transmission/reception point (TRP), included in a coordinated multipoint network, for wireless communication, comprising:
    memory; and
    one or more processors coupled to the memory, the memory and the one or more processors configured to:
        identify a first redundancy version for a first communication to be transmitted to a user equipment (UE) in a transmission time interval (TTI);
        transmit the first communication, having the first redundancy version, in the TTI,
            wherein the first redundancy version is different from a second redundancy version of a second communication to be transmitted by a second TRP in the TTI,
            wherein the second TRP is included in the coordinated multipoint network, and
            wherein downlink control information (DCI) associated with the first communication and the second communication are transmitted in the TTI; and
        receive uplink control information (UCI) associated with the first communication and the second communication in the TTI.

27. The first TRP of claim 26, wherein the first communication and the second communication are different redundancy versions of an initial transmission or a retransmission.

28. The first TRP of claim 26, wherein the first communication and the second communication are transmitted based at least in part on receiving a negative acknowledgement (NACK) corresponding to a failed communication from a TRP included in the coordinated multipoint network.

29. The first TRP of claim 28, wherein the TRP is the first TRP.

30. The first TRP of claim 28, wherein the TRP is not the first TRP.

* * * * *